Figure 4:
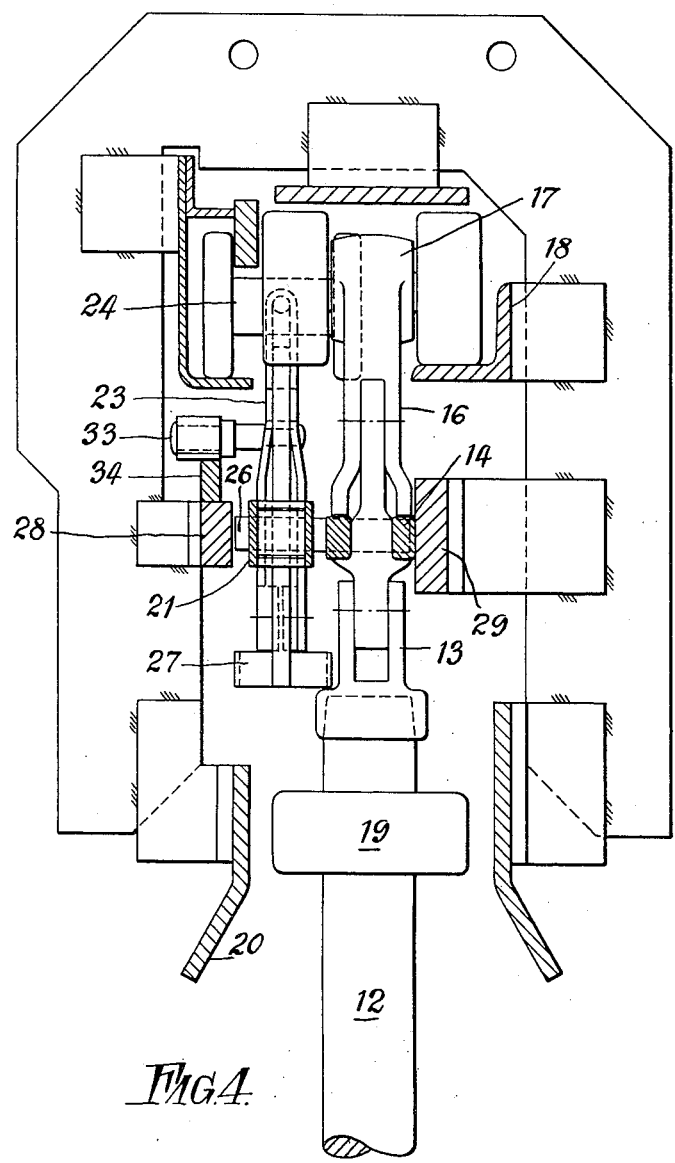

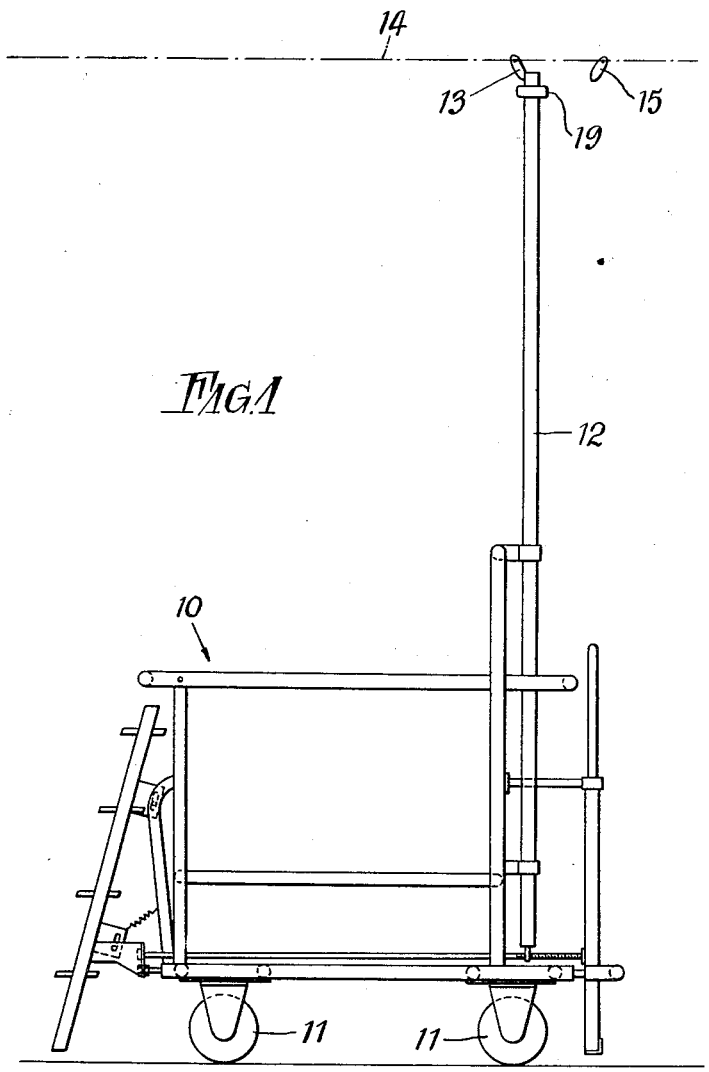

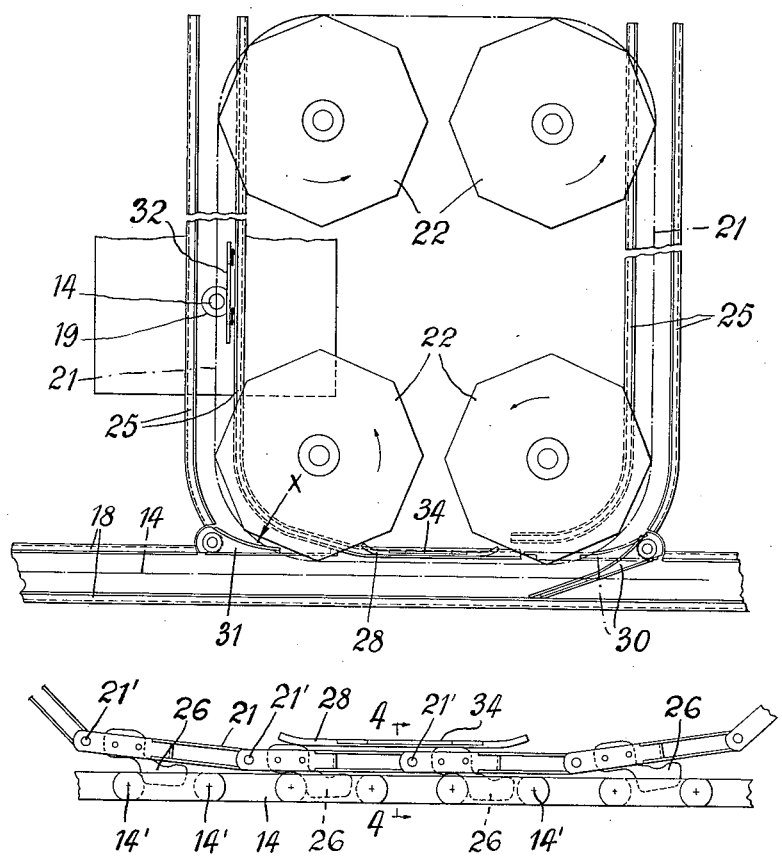

United States Patent Office 3,044,417
Patented July 17, 1962

3,044,417
CONVEYOR SYSTEMS
Arthur Thomas Charles Burrows, Stevenage, England, assignor to Geo. W. King Limited, Stevenage, England, a company of Great Britain
Filed Oct. 26, 1959, Ser. No. 848,669
Claims priority, application Great Britain Oct. 27, 1958
5 Claims. (Cl. 104—172)

This invention relates to conveyor systems and more particularly to conveyor systems of the so-called "overtug" type wherein load carrying trucks are supported on a floor or other surface and are propelled over the latter in a predetermined path by virtue of engagement, with upstanding masts carried by the trucks, of pusher dogs or driving abutments carried by and depending from an overhead endless driven chain arranged at an appropriate level above said floor or surface.

According to the invention in a conveyor system of the kind set forth means are provided for diverting trucks as and when required from the path of the endless driven chain and causing them to follow a secondary path over or across the floor or surface, such means comprising a secondary chain having depending pusher dogs or abutments spaced along the length thereof and adapted to be driven from the first mentioned chain and switch means operable to cooperate with the mast of any selected trolley and to divert the same from the path of such first mentioned chain and into a position wherein it will be engaged by a driving dog or abutment on said secondary chain.

In order that the said invention may be clearly understood and readily carried into effect the same will be more fully described with reference to the accompanying drawings in which:

FIGURE 1 is a side elevational view illustrating a load carrying trolley employed in the type of conveyor system with which the invention is concerned, FIGURE 2 is a plan view illustrating a portion of a main conveyor line and a secondary line, FIGURE 3 is a plan view illustrating the disposition or relationship of the driving chains of the main and secondary conveyor lines in the region of the transfer zone from one to the other, and FIGURE 4 is an enlarged section taken on the line 4—4 of FIGURE 3.

As indicated above the invention is concerned with a so-called "overtug" conveyor, i.e. a conveyor of the kind wherein wheeled load trucks are supported on a floor or other surface and are adapted to be propelled over or across the latter in a predetermined path by virtue of engagement, with upstanding masts carried by the trucks, of pusher dogs or driving abutments which are carried by and depend from an overhead endless driven chain arranged at an appropriate level above the floor or surface. In FIGURE 1 of the drawings one load truck of the kind indicated is illustrated, such truck which is designated generally by 10 being provided with floor engaging wheels 11 and with an upstanding mast 12 with which a pusher dog 13 on an endless driven chain 14 is adapted to cooperate. 15 denotes a so-called retainer dog the purpose of which is to prevent undesired forward travel of the truck relatively to the driving chain. The chain 14 is supported in known manner at spaced points along its length by means of depending hangers or the like which are carried by wheeled trolleys adapted to run on fixed overhead tracks. In FIGURE 4 one of the hangers is indicated at 16, a wheeled supporting trolley at 17 and the tracks at 18. In order to insure that the trucks will follow the path of the driving chain 14 and that contact of the masts with the pusher dogs or abutments 13 will be maintained each mast is provided at its upper part with a freely rotatable guide roller 19 (FIGURES 1 and 4) adapted to cooperate with fixed parallel guides associated with or forming a part of the chain track structure and depending therefrom. In FIGURE 4 the guides with which the rollers 19 cooperate are indicated at 20.

In the embodiment illustrated means are provided so that trucks may, when required, be diverted from what may be termed the main conveyor, i.e. the path defined by the chain 14 and caused to travel along a predetermined secondary path over the floor or other surface, the arrangement illustrated also being such that any trucks so diverted may again be returned to the main conveyor for forward movement along the latter. Referring now to FIGURES 2–4, 21 denotes a second endless chain which is arranged at the same level as the main conveyor drive chain 14 and passes around freely rotatable corner wheels or sprockets 22 to form a closed loop or circuit. As will be seen from FIGURE 3 the main chain 14 is of a known type comprising a succession of flat so-called inner and outer links interconnected by connecting pins indicated at 14'. The secondary chain 21 is also of a known type comprising a succession of substantially U shaped links interconnected by connecting pins 21', such chain being supported at spaced points along its length by means of hangers or the like which depend from wheeled trolleys running on fixed overhead tracks. One of the hangers and one of the trolleys are indicated respectively at 23 and 24 in FIGURE 4 while the tracks for the trolleys 24 are indicated at 25 in FIGURE 2. As will be clearly seen from FIGURES 2 and 3 the secondary chain 21 is, for a preselected length of its path of travel, arranged to move in close proximity and parallel to the chain 14 of the main conveyor and it is provided throughout its length with specially shaped teeth or projections 26 which project laterally therefrom and will, when in that part of the chain in proximity to said main chain, mesh or engage with the latter. Each tooth or projection 26 will when brought into proximity to the main chain 14 project into the space present between a pair of outer links in such chain and by virtue of such intermeshing or engagement a drive will be imparted from the main chain 14 to the secondary chain 21. The secondary chain carries a plurality of depending pusher dogs or abutments which are spaced along the length thereof, each such dog or abutment being supported in known manner by one of the aforesaid hangers in such a manner as to be capable of a limited vertical sliding movement. In FIGURE 4 one of the depending pusher dogs or abutments of the secondary chain is indicated at 27. The relative arrangement of the chains 14 and 21 and of their respective pusher dogs or abutments 13 and 27 is such that in that section of the conveyor where the chains are in interengagement a pusher dog or abutment 27 on the secondary chain 21 will follow closely behind (reckoned in the directoin of travel) a pusher dog or abutment 13 on the chain 14 of the main conveyor. It will be understood however that although each pusher dog or abutment 27 on the secondary chain 21 will, in the region where the chains are in proximity, be spaced rearwardly of a dog or abutment 13 on the chain 14, it will nevertheless, due to the fact that the chains are disposed in parallel relation at that point, be offset laterally with respect to said dog or abutment on said chain 14. Preferably the forward or leading face of each dog or abutment 27 will be of substantially cup-like or V shape in plan so that on contact with a truck mast the latter will tend automatically to center itself with respect to the dog or abutment. In order to guide the chains 14 and 21 during such time as they are in proximity to each other and to prevent any undesired lateral displacement, fixed guides or skid plates 28 and 29 will be provided, the plate 28 being adapted in fact to cooperate with the teeth or projections 26 to insure that they will be maintained in the required positions.

In order to divert trucks from the path of the chain 14 of the main conveyor a pivoted switch tongue 30 (FIGURE 2) is provided such tongue being disposed at the level of the freely rotatable guide rollers 19 on the trolley masts. The switch tongue 30 will be appropriately arranged in the region of the point whereat the secondary chain 21 diverges from the chain 14. Furthermore the switch tongue 30 may be arranged for manual operation or it may be adapted to be actuated by any appropriate electrical, mechanical or pneumatically operated means.

The arrangement as so far described is adapted to operate as follows:

Normally the switch tongue 30 will be in its inoperative position indicated in dotted lines in FIGURE 2 and in such position the trucks will be caused to follow the path of the chain 14 of the main conveyor, the masts of said trucks being engaged by the pusher dogs or abutments 13 on said chain 14. Due to the interengagement of the chains 14 and 21 the latter will at all times be driven from the chain 14 but due also to the relative dispositioning of the driving dogs or abutments on the two chains, the driving dogs or abutments 27 on the secondary chain 21 will be inoperative and will not contact the mast of any truck. Upon movement of the switch tongue 30 into its operative position as shown in full lines in FIGURE 2 it will project at an appropriate angle across the path of movement of the truck masts along the main conveyor, so that the roller 19 on the mast of the next truck to come along will contact said switch tongue. By virtue of the fact that the truck will still have a forward movement imparted thereto by the pusher dog or abutment 13 of the chain 14 with which its mast has hitherto been in engagement, said truck will, by reason of the contact of the roller 19 on its mast with the switch tongue 30 be diverted from the main conveyor path. As the truck is diverted, the mast will pass out of contact with the dog or abutment 13 on the chain 14 and into the path of the closely following pusher dog or abutment 27 on the secondary chain 21. The mast will be automatically centered with respect to the dog or abutment 27 by virtue of the V shaping of the forward face of the latter and the truck will thereafter be propelled along by the secondary chain 21.

The arrangement may be such that the switch tongue will be restored automatically to its initial position after each actuation. Such means for effecting automatic operation of the switch tongue are well known in the conveyor art and further description thereof is not necessary herein.

As indicated, provision will be made for reintroducing trucks which have been diverted to the secondary path back into the main conveyor line. In the embodiment illustrated such reintroduction is effected at the point X and at that point a freely pivoted tongue 31 is provided which is adapted to be actuated by the masts of the trucks, such tongue 31 being, for example, spring loaded or otherwise influenced so that it will normally assume the position shown. As is usual in the conveyor art, indexer means indicated at 32 (FIGURE 2) will be provided at a point in the secondary path preceding the re-entry point X in order to insure that when a diverted truck is to be returned to the main conveyor it will only be moved into the path of the latter if there is no truck already on the main line with which it might collide and if there is a free driving dog or abutment 13 to receive it.

As indicated above, the dogs or abutments 27 on the chain 21 are so mounted as to be capable of limited vertical displacement and as will be seen from FIGURE 4 each such dog or abutment is provided with a laterally directed roller 33 which is adapted to cooperate with the indexer means 32, the arrangement being such that on contact of the roller 33 with the indexer means, when the latter are operative, the dog or abutment will be displaced upwardly out of driving contact with the truck mast with which it was in engagement. For an understanding of the indexer mechanism and of the operation of the dogs or abutments reference may be had to Patent No. 2,987,012, June 6, 1961, or Patent No. 2,950,688 which issued August 30, 1960. Upon re-entry of a truck into the main conveyor line the roller 33 on the dog or abutment 27 is adapted to cooperate with a strip 34 shaped to provide a ramp so that said dog will be positively lifted clear of the trolley mast which will then be engaged by a dog 13 on the chain 14.

The arrangement of the secondary conveyor may be such that trucks diverted thereto will be caused to travel along a predetermined path or circuit to the re-entry point on the main conveyor or alternatively as shown in FIGURE 2 the arrangement may be such that any truck diverted to the secondary path will after a predetermined movement pass out of contact with the driving chain 21, so that the drive thereto (i.e. the truck) will be discontinued. When it is required to return a truck to the main conveyor it is necessary to position such truck appropriately in relation to that stretch of the chain 21 travelling towards the re-entry point so that it (the truck) will be conveyed to the latter. An appropriate switch or plough device may be provided for diverting trucks from the path of the chain 21 or alternatively a plurality of such devices may be provided at spaced points along such path to allow for diversion of trucks at any one of a number of points or stations. In the latter case the several switch or plough devices may be interconnected in such a manner that each device will only be capable of operation if the device immediately in front thereof has been actuated to divert a truck.

I claim:

1. A conveyor system comprising main and secondary conveyor chains including parallel juxtaposed portions having the same normal forward direction of movement, said secondary chain diverging from said main chain at a first determinable position and converging toward the main chain at a second determinable position, at least one truck adapted for being driven by said main chain, wheels on said truck whereby the latter can be driven over a supporting surface, an upright mast on said truck, a pusher dog on said main chain to engage said mast and drive said truck, a cup-like dog on said secondary chain and opening forwardly relative to said direction, said chains including links respectively adapted for engagement whereby said main chain is adapted to drive said secondary chain, means guiding said chains into said engagement along said parallel juxtaposed portions, said cup-like dog being rearwardly of and laterally displaced relative to said pusher dog with said chains engaged, and means operatively disposed with respect to said chains at said parallel juxtaposed portions to laterally displace said mast relative to said pusher dog and independently of the divergence and convergence of the secondary chain with respect to the main chain into a position for engagement by said cup-like dog whereby the latter assumes the function of driving said truck.

2. A system as claimed in claim 1 wherein said cup-like dog has the general shape of a V and is thus adapted to center the said mast therein.

3. A system as claimed in claim 1 comprising means connecting said cup-like dog to said secondary chain and permitting vertical displacement of the latter said dog relative to said secondary chain, and means to displace said cup-like dog vertically at said second position to free the mast therefrom.

4. A system as claimed in claim 1 comprising a lateral extension on said secondary chain for engaging said main chain whereby the secondary chain is driven by said main chain.

5. A system as claimed in claim 1 wherein said means to laterally displace said mast is positioned adjacent said first position and rearwardly thereof relative to said direction whereby said truck is engaged by said cup-like dog prior to the divergence of the secondary chain from the main chain.

References Cited in the file of this patent

UNITED STATES PATENTS

| | | |
|---|---|---|
| 2,684,039 | King | July 20, 1954 |
| 2,868,138 | Bishop et al. | Jan. 13, 1959 |
| 2,868,139 | Klamp | Jan. 13, 1959 |
| 2,871,799 | King | Feb. 3, 1959 |
| 2,875,704 | Yates | Mar. 3, 1959 |
| 2,897,769 | Bishop et al. | Apr. 4, 1959 |
| 2,936,718 | Bradt et al. | May 17, 1960 |
| 2,949,862 | Klamp | Aug. 23, 1960 |